United States Patent
Krause

(10) Patent No.: US 8,468,745 B2
(45) Date of Patent: Jun. 25, 2013

(54) GARAGE DOOR OPENER LIFT AND STORAGE MECHANISM

(76) Inventor: Blane A. Krause, Lee's Summit, MO (US)

(*) Notice: Subject to any disclaimer, the term of this patent is extended or adjusted under 35 U.S.C. 154(b) by 18 days.

(21) Appl. No.: 13/239,864

(22) Filed: Sep. 22, 2011

(65) Prior Publication Data

US 2012/0079769 A1 Apr. 5, 2012

Related U.S. Application Data

(60) Provisional application No. 61/460,045, filed on Dec. 23, 2010, provisional application No. 61/458,146, filed on Nov. 18, 2010, provisional application No. 61/404,412, filed on Oct. 1, 2010.

(51) Int. Cl.
*E05F 11/00* (2006.01)
*E05F 15/00* (2006.01)
*A47F 7/00* (2006.01)
*A45F 5/08* (2006.01)

(52) U.S. Cl.
USPC .......... 49/199; 49/197; 211/18; 211/117; 211/209; 248/317; 248/323

(58) Field of Classification Search
USPC .......... 49/197, 199; 248/320, 328, 329, 248/317, 332, 323; 254/286, 338, 336; 211/117, 211/118, 18, 17, 19, 20, 1.51, 1.56, 209
See application file for complete search history.

(56) References Cited

U.S. PATENT DOCUMENTS

| | | | |
|---|---|---|---|
| 3,682,523 A | 8/1972 | Esposito | |
| 3,770,133 A * | 11/1973 | Kolker | 211/19 |
| 3,782,559 A | 1/1974 | Wright | |
| 3,828,936 A | 8/1974 | Hoenig | |
| 3,872,972 A | 3/1975 | Cummins et al. | |
| 3,883,002 A | 5/1975 | Moore et al. | |
| 3,907,113 A | 9/1975 | Kropelnitski et al. | |
| 3,924,751 A | 12/1975 | Ballenger et al. | |
| 3,976,200 A | 8/1976 | Munns | |
| 4,116,341 A | 9/1978 | Hebda | |
| 4,136,782 A | 1/1979 | Hugel | |
| 4,352,432 A | 10/1982 | Smith | |
| 4,392,572 A | 7/1983 | Bernard | |
| 4,416,379 A | 11/1983 | Graber | |
| 4,452,384 A | 6/1984 | Graber | |
| 4,571,903 A * | 2/1986 | Strassner | 52/173.1 |
| 4,702,401 A | 10/1987 | Graber et al. | |
| 4,733,810 A | 3/1988 | Graber et al. | |
| 4,749,089 A | 6/1988 | Stewart | |
| 4,842,148 A | 6/1989 | Bowman | |
| 5,016,391 A * | 5/1991 | Miller et al. | 49/70 |

(Continued)

*Primary Examiner* — Katherine Mitchell
*Assistant Examiner* — Scott Denion
(74) *Attorney, Agent, or Firm* — Shook, Hardy & Bacon LLP; Peter Knops; Brian Mack

(57) ABSTRACT

A lifting and storage mechanism for storing a component in a garage using the energy of a powered garage door opening and closing system is disclosed. The lifting and storage mechanism includes a pulley system for raising and lowering the stored components and a latching mechanism having a spring latch for securing the components in a stored condition. In order to lower the stored components from a storage position, an operator initiates manual release of the spring latch or activation of an electromechanical release combined with activation of the motor of the powered garage door opening and closing system.

11 Claims, 13 Drawing Sheets

U.S. PATENT DOCUMENTS

| | | | |
|---|---|---|---|
| 5,078,276 A | 1/1992 | Rogge et al. | |
| 5,082,120 A | 1/1992 | Vega | |
| 5,125,517 A | 6/1992 | Martinell | |
| 5,183,162 A * | 2/1993 | Ritzenthaler | 211/1.57 |
| 5,292,009 A | 3/1994 | Smith | |
| 5,294,006 A | 3/1994 | Deschino | |
| 5,332,104 A | 7/1994 | Santella | |
| 5,354,035 A | 10/1994 | Helgren | |
| D353,353 S | 12/1994 | Katsaros | |
| 5,447,241 A | 9/1995 | Bureau | |
| 5,449,074 A | 9/1995 | Paulson et al. | |
| 5,460,274 A | 10/1995 | Kramer | |
| 5,474,189 A | 12/1995 | Peterson | |
| 5,664,687 A | 9/1997 | Liatti | |
| 5,794,793 A | 8/1998 | Frederick | |
| 5,833,074 A | 11/1998 | Phillips | |
| 5,845,788 A | 12/1998 | Robolin | |
| 5,848,708 A | 12/1998 | Edwards | |
| 5,887,461 A | 3/1999 | Heffley | |
| 5,941,397 A | 8/1999 | Buchanan et al. | |
| 5,984,111 A | 11/1999 | Pennella | |
| 6,095,344 A | 8/2000 | White | |
| 6,161,702 A | 12/2000 | Campbell | |
| 6,237,781 B1 | 5/2001 | Dahl | |
| 6,302,278 B1 | 10/2001 | Dueck | |
| 6,446,816 B1 | 9/2002 | Miller | |
| 6,648,148 B1 | 11/2003 | Bally | |
| 6,729,478 B1 | 5/2004 | Boers | |
| 7,000,783 B2 | 2/2006 | Webb | |
| 7,150,449 B1 | 12/2006 | Dueck et al. | |
| 7,165,684 B2 | 1/2007 | Ferron | |
| 7,225,933 B1 | 6/2007 | Pollock et al. | |
| 7,325,785 B2 | 2/2008 | Krengel et al. | |
| 7,494,110 B2 | 2/2009 | Lob et al. | |
| 7,631,854 B1 | 12/2009 | Mountain | |
| D621,751 S | 8/2010 | Rost, Jr. | |
| 7,784,622 B2 | 8/2010 | Bernard | |
| 7,815,055 B2 | 10/2010 | Lang | |
| 2004/0050807 A1 | 3/2004 | Cheng | |
| 2007/0029267 A1 | 2/2007 | Hall | |
| 2007/0107322 A1 | 5/2007 | Blume | |
| 2010/0237026 A1 | 9/2010 | Shaha et al. | |

* cited by examiner

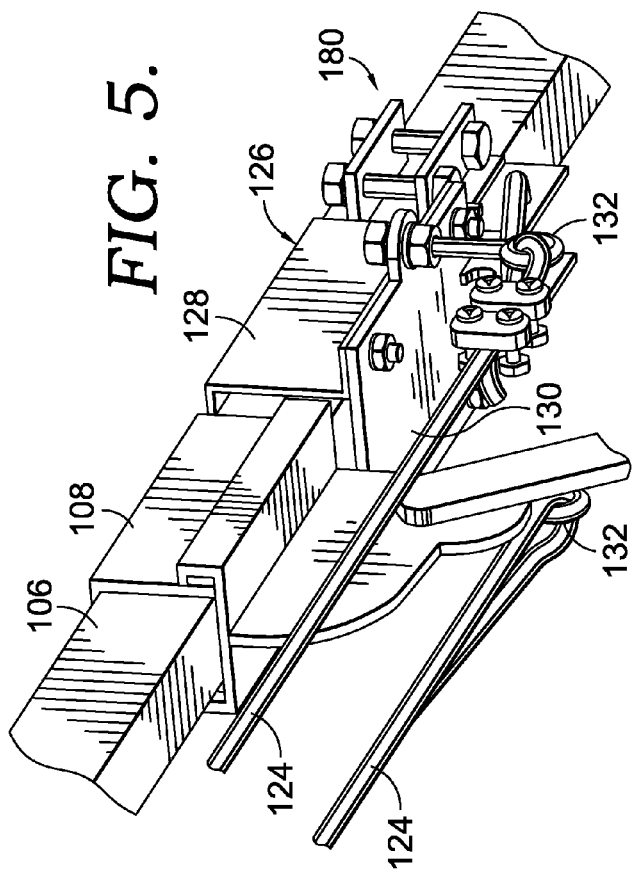
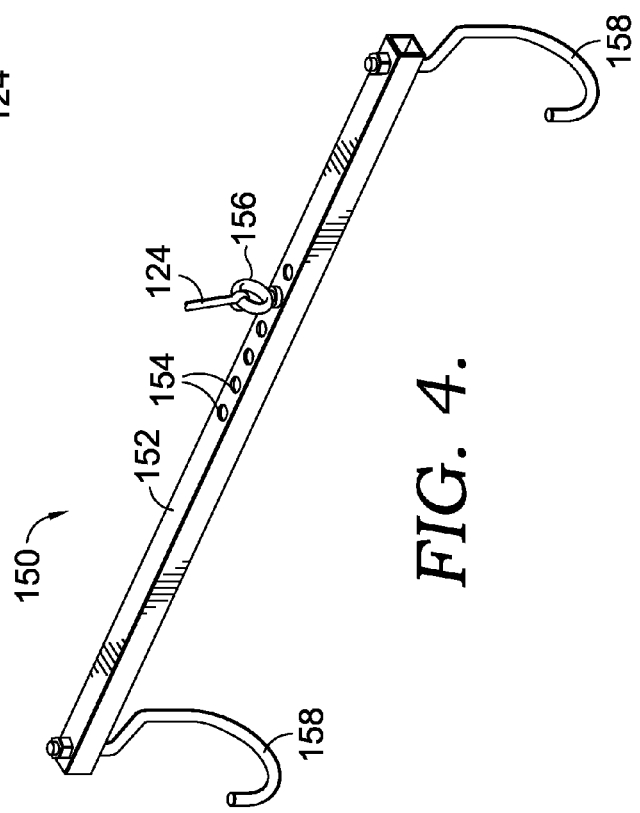

GARAGE DOOR OPENER LIFT AND STORAGE MECHANISM

CROSS-REFERENCE TO RELATED APPLICATIONS

This application claims priority to U.S. Provisional Patent Application Ser. No. 61/404,412 filed on Oct. 1, 2010, Application Ser. No. 61/458,146 filed on Nov. 18, 2010, and Application Ser. No. 61/460,045 filed on Dec. 23, 2010.

STATEMENT REGARDING FEDERALLY SPONSORED RESEARCH OR DEVELOPMENT

Not applicable.

TECHNICAL FIELD

The present invention relates generally to a system for storing a bicycle. More specifically, the present invention discloses a system which utilizes a powered garage door opening and closing system to provide mechanical energy to lift the bicycle to a storage position, secure the bicycle in the storage position, and lower the bicycle from the storage position.

BACKGROUND

Typical garages and other storage facilities often are used to store automobiles, boats, patio furniture, holiday decorations, children's toys, bicycles, and other outdoor recreational equipment in order to protect these items from inclement weather or risk of theft. As such, homeowners and other users of garages desire to maximize the available storage space in their garage.

One of the most common items typically stored in a garage, but is difficult to store because it occupies a large amount of space, is a bicycle. During the biking season, bicycles are typically stored on the garage floor for easy and quick access. However, this way of storage can occupy a lot of space and in non-biking seasons, it is necessary to find an alternate storing method.

A device commonly used to store bicycles when not in use is a hook-type device that is mounted in the ceiling or on a wall of the garage. Using such a fixed device requires the bicycle owner to balance and manually lift the bicycle overhead and place the bicycle on the hook or rack. This manual storage process is inconvenient, time consuming, and dangerous.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to a lifting and storage mechanism utilizing a powered garage door opening and closing system and a pulley system coupled to the garage door opening and closing system where the motor of the garage door opening system is capable of regulating movement of a lifting arm assembly for storing a bicycle or other object in an elevated position. The lifting and storage mechanism comprises a powered garage door opening and closing system operating along a rail and capable of raising and lowering a garage door independent of or in conjunction with a pulley system and lifting arm assembly.

The mechanism also comprises a latching mechanism for securing a pulley system in a stored condition comprising a spring latch and a set of binding brackets that secure the spring latch to the rail of a garage door opening system. The mechanism also includes a sliding channel bracket assembly having a base plate with a locking plate portion having a recessed portion sized to engage the latching mechanism. The latching mechanism secures the lifting arm assembly in a raised or storage position when the spring latch slides along the locking plate of the sliding channel bracket assembly and engages the recessed portion. The sliding channel bracket assembly can be unlocked by pulling a release cord while simultaneously operating the motor of the garage door opening system so as to lower the pulley system.

A lifting arm assembly is secured to the pulley system and provides a means of lifting an object into a storage position. The lifting arm assembly comprises a bar-like support member having one or more hooks extending outward from the support member and an eye bolt located proximate the mid-span of the support member and coupled to the pulley system such that the support member and hooks can be raised into a storage position or lowered towards a garage floor by the pulley system.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views:

FIG. 4 is a perspective view of a lifting arm assembly in accordance with an embodiment of the present invention;

FIG. 5 is a perspective view of a portion of the rail and sliding channel bracket assembly in accordance with an embodiment of the present invention;

DETAILED DESCRIPTION

Figure 1:
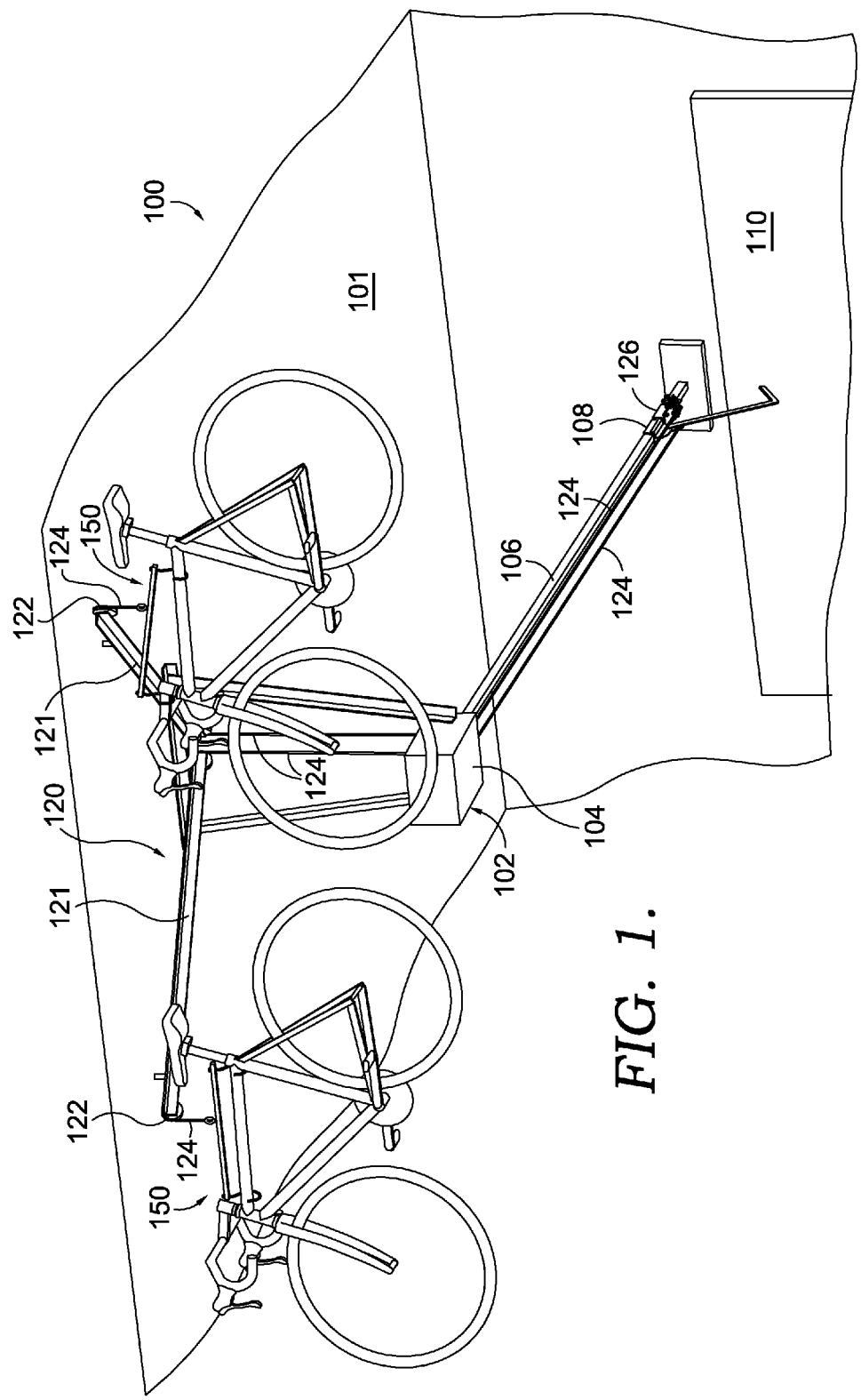
FIG. 1 is a perspective view of a lifting and storage mechanism capable of storing multiple bicycles in accordance with an embodiment of the present invention.

With reference to the drawings, wherein like reference characters designate like parts throughout the different views, a lifting and storage mechanism is disclosed. More specifically, a system for storing an object such as a bicycle in a garage is disclosed, where the system harnesses energy from a garage door opener to lift bicycles into a confined spaced adjacent to the ceiling. Through this system, bicycles are stored such that the storage space of a garage can be more efficiently utilized while also reducing the risk of injury when trying to manually store a bicycle in an elevated position, such as on a garage wall.

Referring initially to FIG. 1, a lifting and storage mechanism 100 in accordance with an embodiment of the present invention is depicted. The mechanism 100 utilizes an existing, or newly installed, powered garage door opening system 102. The mechanism 100 comprises a powered garage door opening system 102, where the powered garage door opening system 102 comprises a motor 104, a rail or track mechanism 106 that is coupled to the housing of the motor 104, and a door lifting bracket 108. The door lifting bracket 108 is coupled at one end to the rail 106 and at an opposing end to an upper region of a garage door 110.

Figure 14:
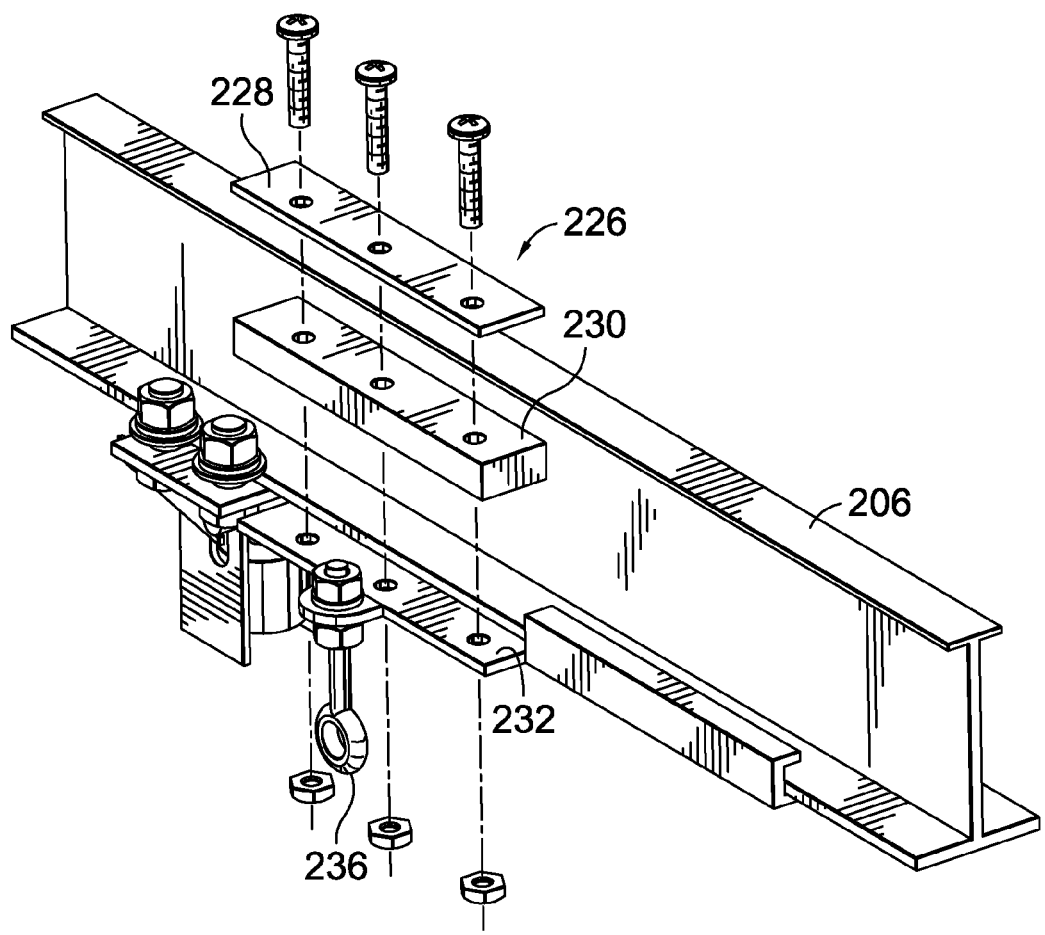
FIG. 14 is a perspective view of a portion of the rail and sliding channel bracket assembly in accordance with an alternate embodiment of the present invention.

Upon activation of the motor 104, a drive mechanism causes the door lifting bracket 108 to travel along the length of the rail 106, raising or lowering the garage door 110. In a typical configuration, the door lifting bracket 108 travels approximately 7 feet along rail 106. For the embodiment shown in FIGS. 1-3, 5,6, and 8-11, the rail has a general square cross sectional shape. However, the rail 106 can be a variety of shapes depending on the garage door opening system manufacturer and lifting requirements. For example, in an alternate embodiment of the present invention, as depicted in FIG. 14, the rail 106 can have a "T-shape" cross section.

Figure 6:
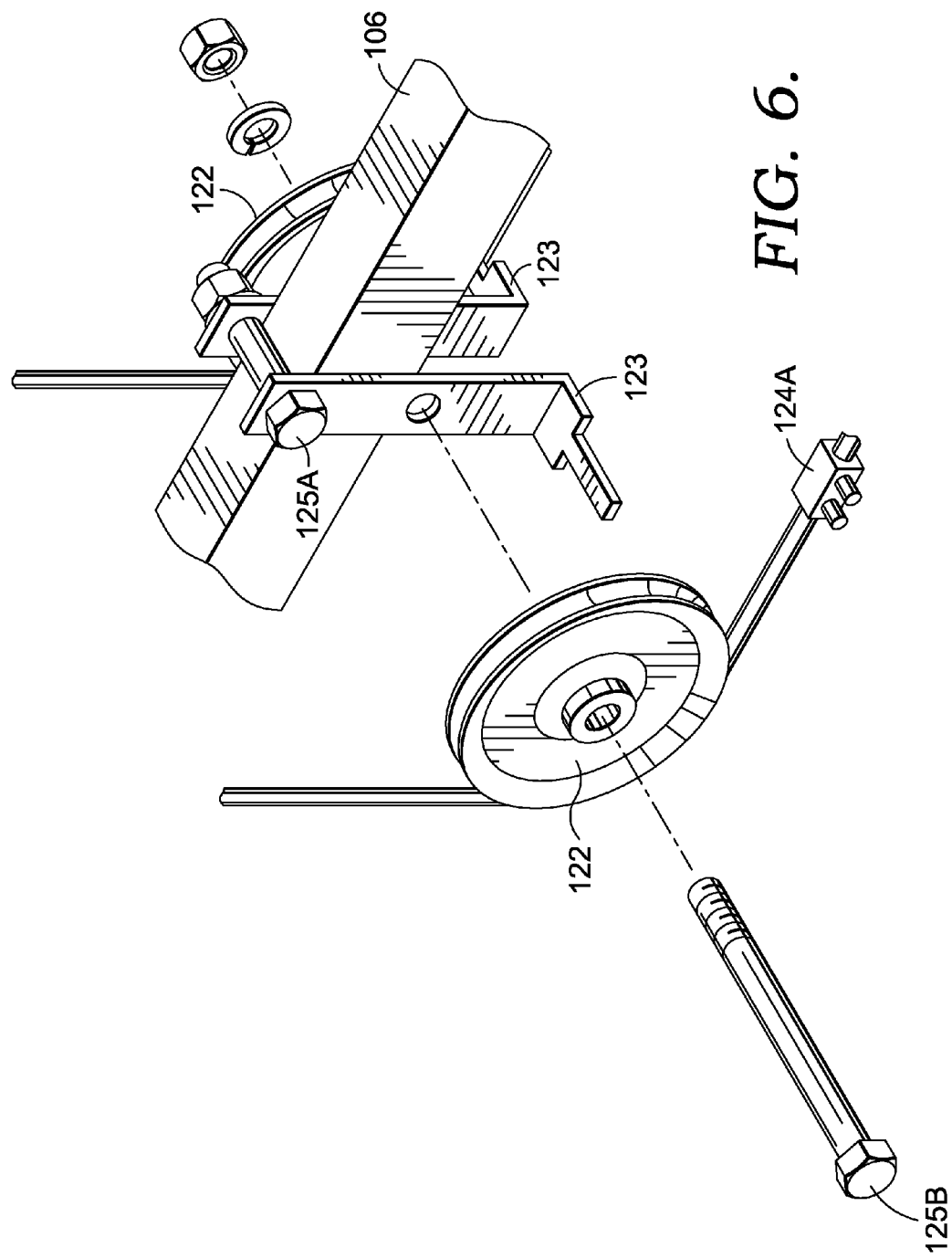
FIG. 6 is a detailed portion of a perspective view depicting a portion of the rail and a portion of a pulley system in accordance with an embodiment of the present invention.

The lifting and storage mechanism 100 also comprises a pulley system 120 coupled to the powered garage door opening system 102. The pulley system 120 has a plurality of pulley wheels 122 and at least one cable 124 running through the plurality of pulley wheels 122. The pulley wheels 122 are preferably three inch diameter wheels and are bolted on each side of the rail 106 and to the angle bracket 121. Referring to FIG. 6, an embodiment of the present invention is shown having multiple storage areas utilizing two sets of pulley systems 120, where the pulley wheels 122 adjacent the motor 104 are bolted together using a pair of L-shaped brackets 123 and an upper bolt 125A and lower bolt 125B. As shown in FIG. 6, the lower bolt 125B is approximately five inches in length and passes immediately adjacent to a lower edge of the rail 106, while the upper bolt 125A passes adjacent the upper edge of the rail 106.

The pulley system 120 also includes cable stop collars 124A that are mounted on each of the cables 124 by two set screws. The cable stop collars 124A regulate the amount of travel cable 124 has through the pulley system 120. The cable 124 is threaded through the stop collars 124A during assembly and the position of the stop collars is adjusted during installation in order to set the desired stop height of the lifting arm assembly 150. Travel of cable 124 is prevented when the stop collars 124A catch on the L-shaped brackets 123.

Figure 2:
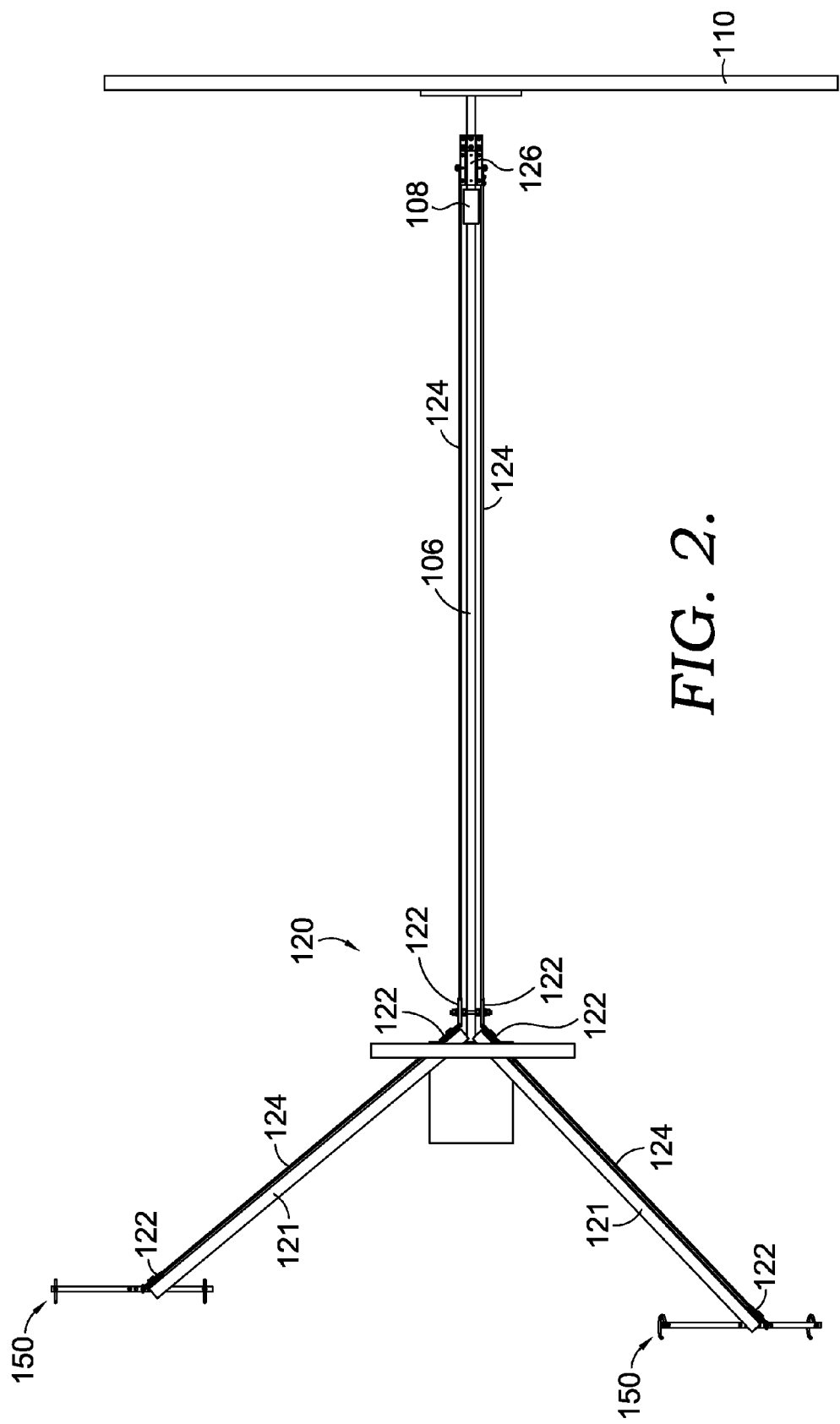
FIG. 2 is a top elevation view of the lifting and storage mechanism of FIG. 1 in accordance with an embodiment of the present invention.
Figure 7:
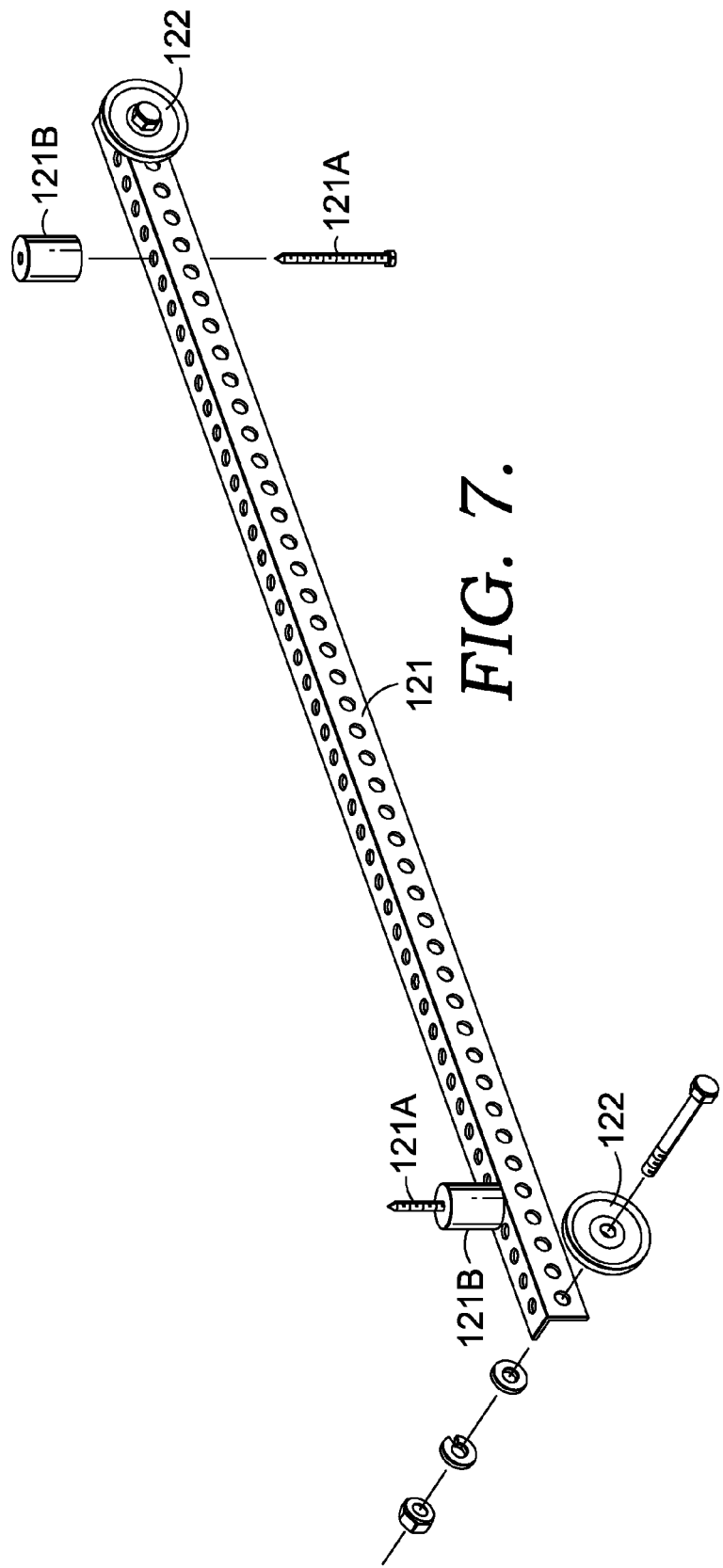
FIG. 7 is a perspective view of a portion of the pulley system in accordance with an embodiment of the present invention.

The pulley system 120 is positioned within the garage and in conjunction with the powered garage door opening and closing system 102 by a series of angle steel brackets 121, as shown in FIG. 7. That is, the angled bracket 121 is suspended from the wood structure of the garage ceiling with lag bolts 121A and spacers 121B providing clearance for pulleys to spin freely. As shown in FIG. 2, the angled bracket 121 is typically mounted at an angle of approximately 45 degrees from the rail 106. As shown in FIGS. 1 and 2, an angled arrangement of angled brackets 121 provides sufficient spacing between multiple storage locations. However, the 45 degree angle from rail 106 shown in FIG. 2 is but one configuration and other angles could be used depending on the garage ceiling parameters as well as the size of objects to be stored by the pulley system 120. Using this type of arrangement of pulley system 120 allows for an operator to store multiple bicycles. As it is well understood, similar type angled brackets 121 are also used for providing vertical support to the garage door opening system 102 as it is suspended from a garage ceiling 101.

The angled brackets 121 that are mounted at an angle relative to the rail 106 are preferably used in garages having high ceilings (i.e. 10 feet or greater). The size and length of these angled brackets 121 will depend on whether the bikes are to be stored above where a car is parked or in front of the car. If the storage area is to be directly over the parked car, angled brackets 121 will be shorter in length than if the bicycle storage area is to be in front of the parked car. Additional angled brackets 121 and pulley wheels 122 can be added or removed from the pulley system 120 in order to create the proper storage location that will meet a user's requirements as well as conform to the garage ceiling space.

For garages having lower ceilings, sloped ceilings, or ceilings with obstructions, it may not be possible to use angled brackets 121 to extend along the ceiling 101. For these configurations, additional pulley wheels 122 can be mounted directly into the ceiling 101 or garage wall (not depicted).

Figure 3:
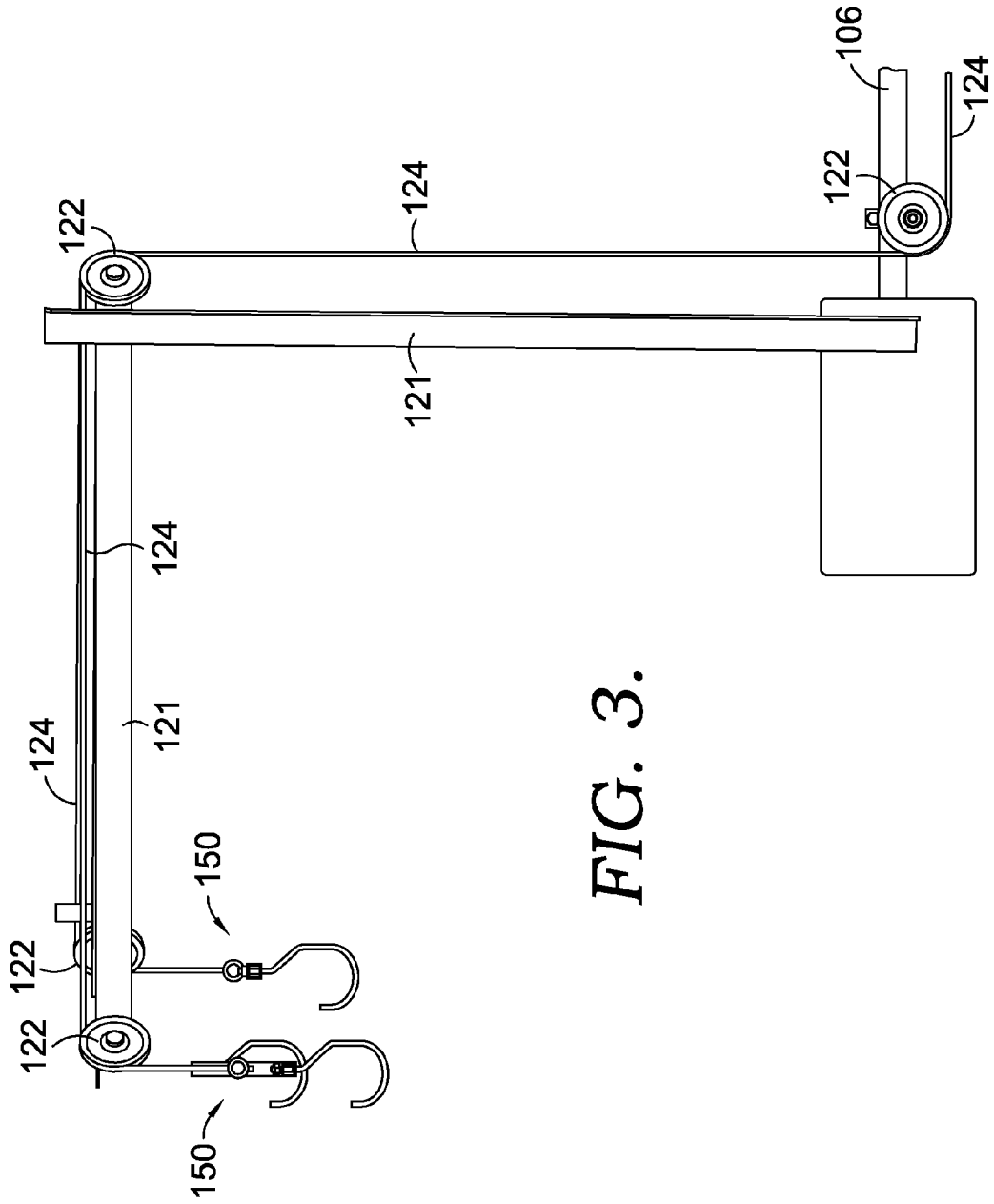
FIG. 3 is an elevation view of a portion of the lifting and storage mechanism in accordance with an embodiment of the present invention.

Cable 124 can be used for a single storage area, or as depicted in FIGS. 1-3, a plurality of cables 124 can be utilized for setting up two different storage areas. The pulley system 120 also includes a sliding channel bracket assembly 126. As depicted in FIG. 5, the sliding channel bracket assembly 126 is positioned adjacent the door lifting bracket 108 and encompasses the rail 106, yet is not directly fixed to the rail, such that movement of the sliding channel bracket assembly 126 is generally controlled by movement of the door lifting bracket 108. That is, the sliding channel bracket assembly 126 can slide along the rail 106, but maintains in a position adjacent to the door lifting bracket 108 due to the weight of the lifting arm assembly 150, that is coupled to the sliding channel bracket assembly 126 via the pulley system 120. In order to prevent any interference between the cable 124 and the rail 106 (and its associated belt or drive mechanism), the cable 124 remains parallel to and approximately one inch away from the rail 106.

Figure 8:
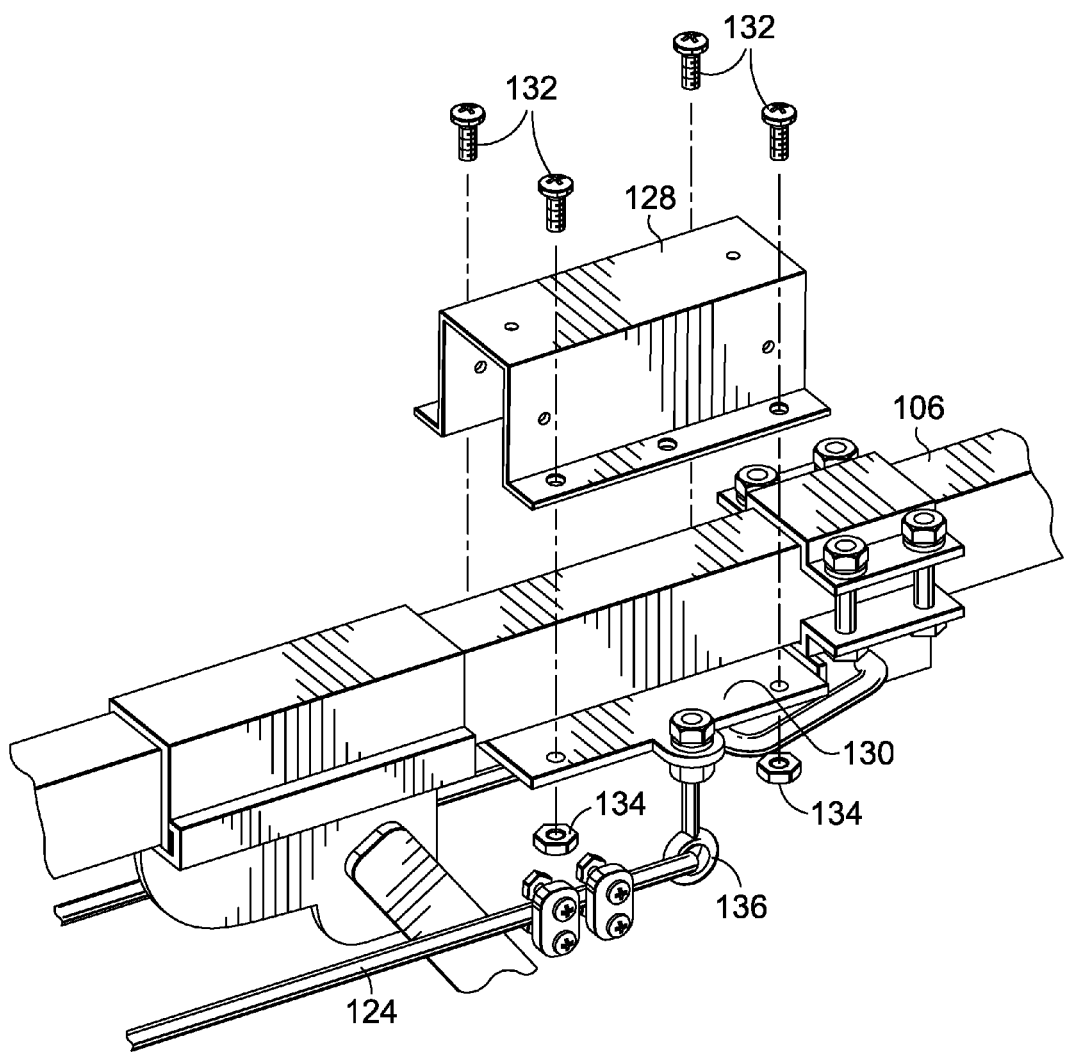
FIG. 8 is a perspective view of a portion of the rail and sliding channel bracket assembly in accordance with an embodiment of the present invention.
Figure 9:
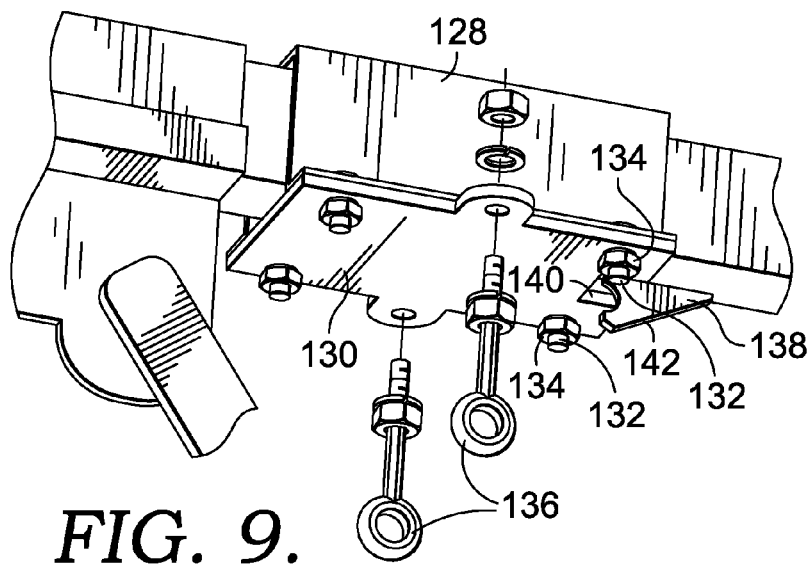
FIG. 9 is an alternate perspective view of a portion of the rail and sliding channel bracket assembly in accordance with an embodiment of the present invention.

Referring to FIGS. 8 and 9, the sliding channel bracket assembly 126, is generally made from a U-shaped bracket member 128 and a base plate 130 which are secured together by a series of fasteners such as bolts 132 and nuts 134. The U-shaped configuration of the sliding channel bracket assembly 126 allows for the bracket assembly to encompass the square cross sectional shape of rail 106. Secured to a lower surface of base plate 130 is one or more eye bolts 136. One eye bolt 136 is required to serve as the forward termination point of each cable 124. The eye bolts 136 are fixed to the base plate 130 by a fastener or threading arrangement. Alternatively, the eye bolts 136 could be permanently secured to the base plate 130 through a welded arrangement. Extending generally perpendicular from the base plate 130 is a locking plate 138. The locking plate 138 includes a recessed portion 140 and has an angled surface 142, where the recessed portion 140 is sized to engage a latch mechanism.

While a number of garage door opening and closing systems use a rail 106 having a generally square cross section, an alternate configuration uses a "T-shaped" rail 206, as shown in FIG. 14. Because the rail shape is different, changes are also necessary for the sliding channel bracket assembly. Specifically, the sliding channel bracket assembly 226 does not encompass the rail, but instead grasps onto the rail 206 along a bottom portion of the "T" and sandwiches a portion of the bottom "T" through a top plate 228, spacer 230, and bottom plate 232. The bottom plate 232 has an eye bolt 236 to which the cable 124 can be secured. Regulating the movement of the sliding channel bracket assembly 226 is similar to that discussed above.

Referring to FIG. 4, the pulley system 120 also includes a lifting arm assembly 150. The lifting arm assembly 150 comprises a bar-like support member 152 having opposing ends and a plurality of openings 154 for an eye bolt 156. Multiple openings 154 are necessary so that the eye bolt 156 can be placed in the center of gravity of support member 152 when a stored item, such as a bicycle, is supported on hooks 158. This ensures that the bicycle hangs generally level from eye bolt 156. The support member 152 is a generally square cross sectional bar, but could be made from other shaped or solid bar stock. The cable 124 extends from pulley 122 and is secured to eye bolt 156. Extending beneath and generally perpendicular to each end of the support member 152 is a J-shaped hook 158. The hooks 158 can be used to mount the item to be stored, such as a bicycle. In the embodiment shown in FIG. 4, the lifting arm assembly 150 includes two J-shaped hooks at opposing ends of the support member 152. The lifting arm assembly 150 is sized such that a bicycle can be mounted either right side up or inverted. In an upright configuration, the two J-shaped hooks 158 are placed at opposing ends of the center beam of a bicycle, which extends from the rider's seat to approximately the handle bars. This is shown in FIG. 1. By rotating lifting arm assembly 150 so that one hook is higher relative to the garage floor, the traditional frame shape of a girl's bicycle can also be placed on J-shaped hooks 158. Alternatively, when a bicycle is stored in an inverted position, the J-shaped hooks engage both the front wheel and rear wheel of the bicycle.

Figure 10:
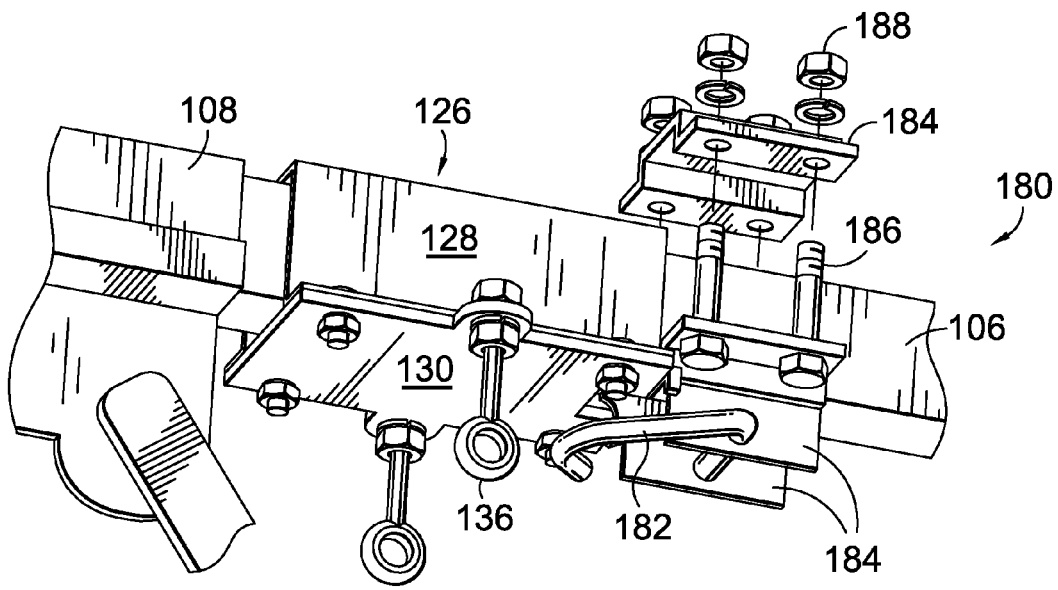
FIG. 10 is a perspective view of a latching mechanism and portion of the rail in accordance with an embodiment of the present invention.
Figure 11A:
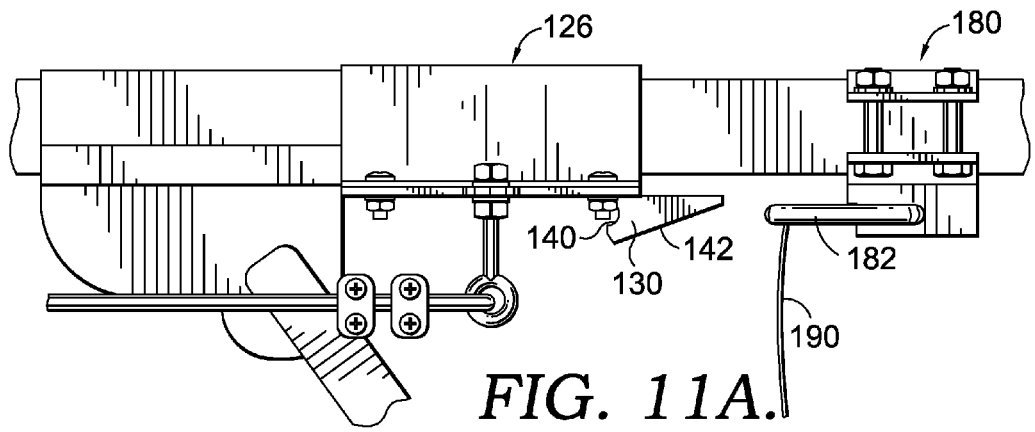
FIG. 11A is an elevation view of the sliding channel bracket assembly detached from the latching mechanism in accordance with an embodiment of the present invention.
Figure 11B:
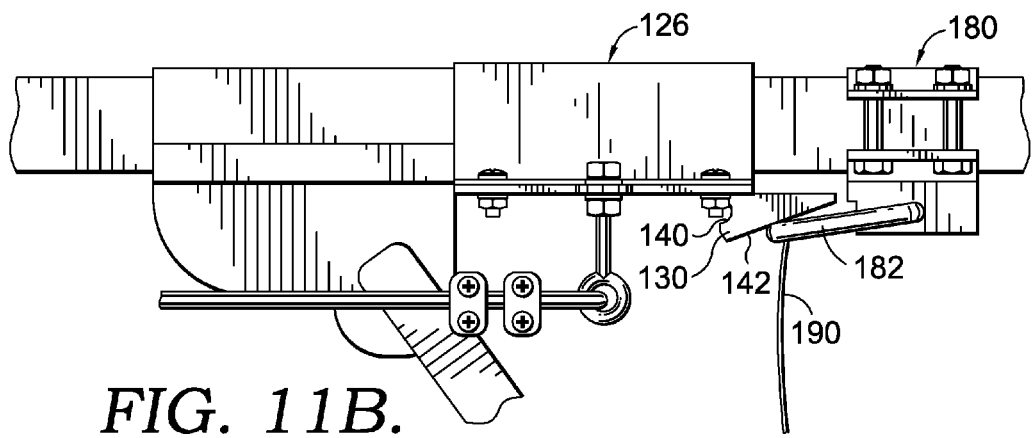
FIG. 11B is an elevation view of the sliding channel bracket assembly in the process of engaging the latching mechanism in accordance with an embodiment of the present invention.
Figure 11C:
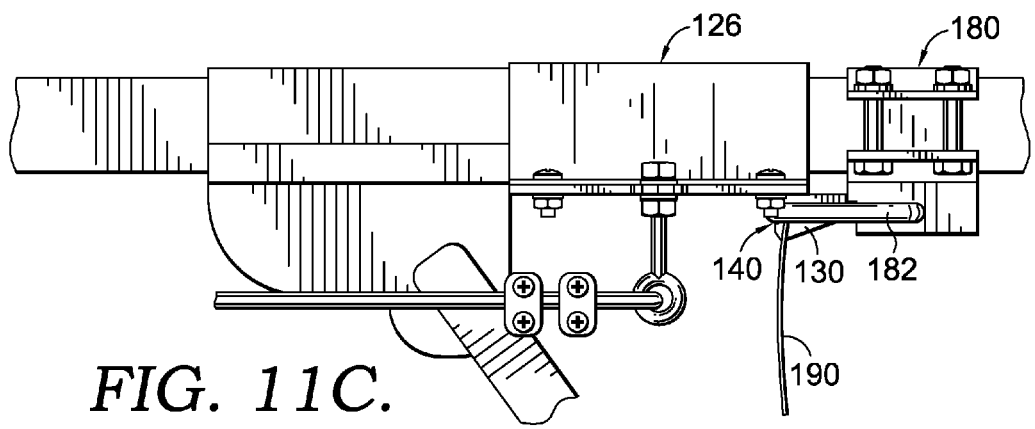
FIG. 11C is an elevation view of the sliding channel bracket assembly attached to the latching mechanism in accordance with an embodiment of the present invention.
Figure 12:
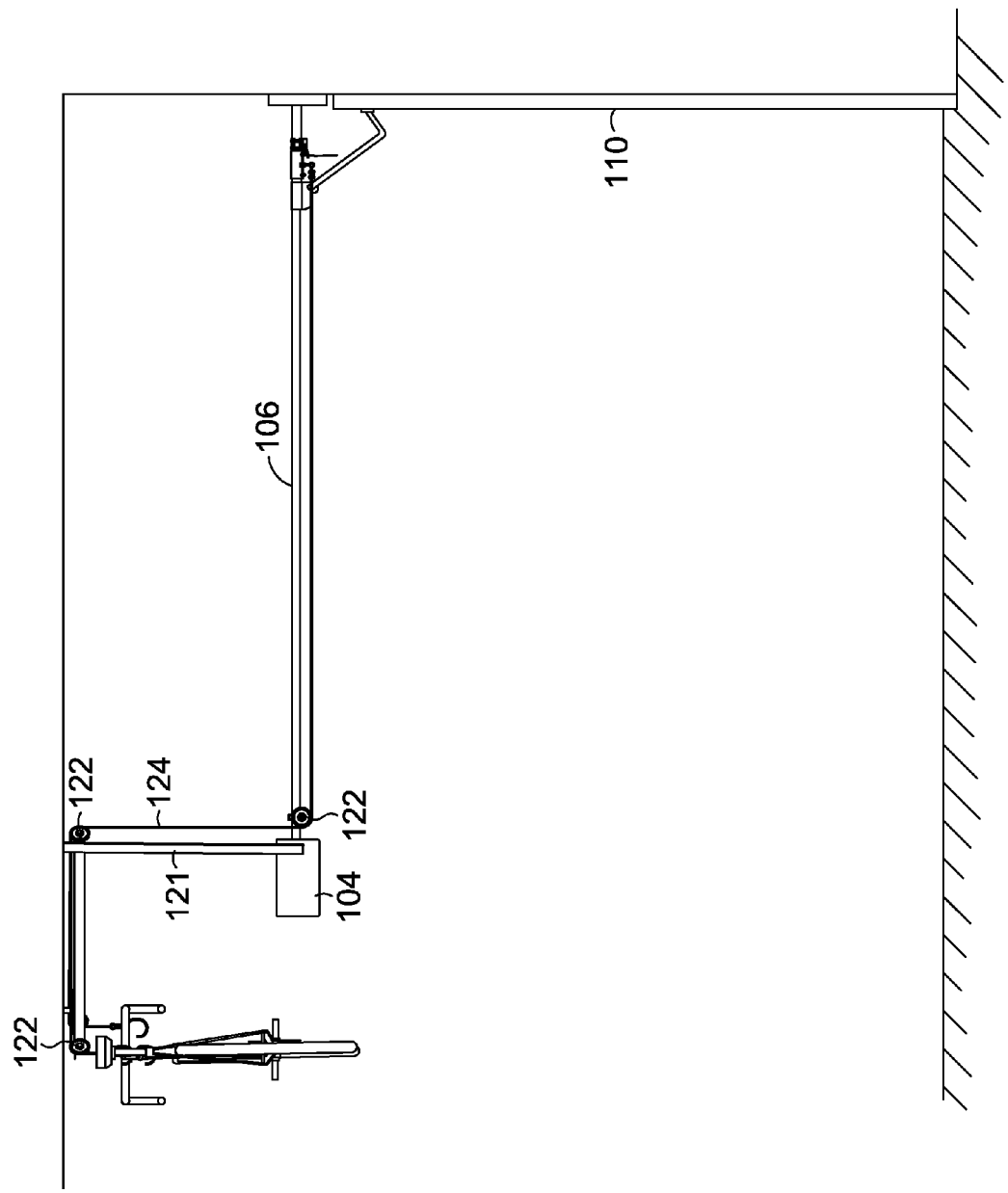
FIG. 12 is an elevation view depicting a bicycle positioned in a storage condition in accordance with an embodiment of the present invention.
Figure 13:
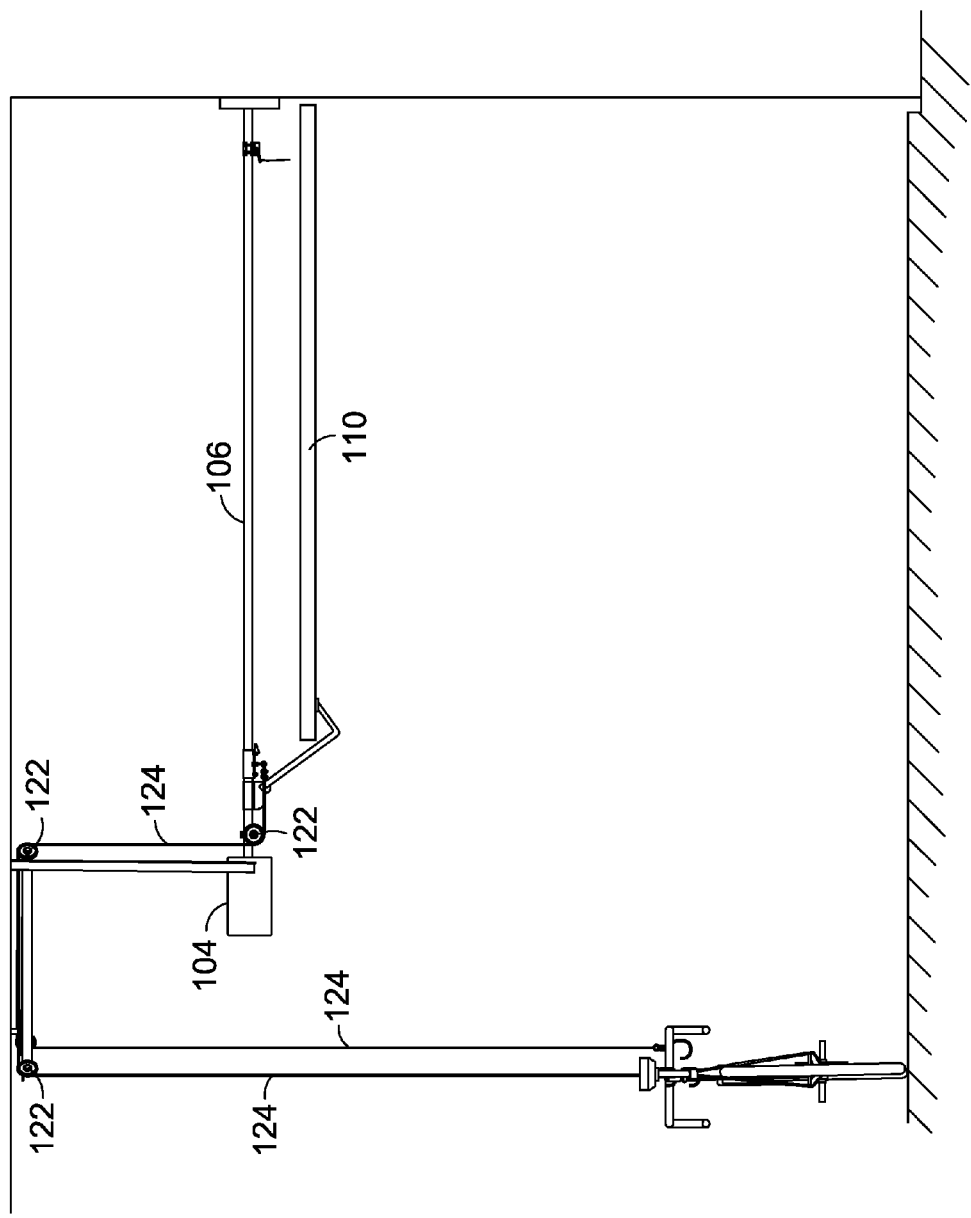
FIG. 13 is an elevation view depicting a bicycle positioned in an accessible condition in accordance with an embodiment of the present invention.

Referring to FIG. 10, the lifting and storage mechanism 100 also comprises a latching mechanism 180 for maintaining the pulley system 120 in a stored condition. The latching mechanism 180 comprises a spring latch 182 and a set of binding brackets 184 that are secured to the rail 106 by fasteners such as bolts 186 and nuts 188. The latching mechanism 180 is positioned towards an end of the rail 106 adjacent the garage door 110. The sliding channel bracket assembly 126, discussed above, utilizes the spring latch 182 in order to lock the pulley system 120 in a stored condition. That is, when the sliding channel bracket assembly 126 is moving towards the spring latch 182, the pulley system 120 retracts into a raised or storage position. The interaction between the sliding channel bracket assembly 126 and latching mechanism 180 is shown in FIGS. 11A-11C. In FIG. 11A, the sliding channel bracket assembly 126 approaches the spring latch 182 of the latching mechanism 180. Then, as shown in FIG. 11B, the angled surface 142 of the locking plate 130 slides along the spring latch 182, until the spring latch 182 engages the recessed portion 140 of the locking plate 130. The engaged and secured position of the spring latch 182 within the recessed portion 140 is depicted in FIG. 11C.

Referring to FIGS. 11A-11C, the latching mechanism 180 further comprises a release cord 190 coupled to the spring latch 182. The release cord 190 is designed to provide a means for releasing the sliding channel bracket assembly 126 from the spring latch 182. In order to release the sliding channel bracket assembly 126 from the spring latch 182, an operator pulls the release cord 190 while activating the motor 104 of the garage door opening system 102. The motor can be activated by depressing a remote control (not pictured) that is in wireless communication with the garage door opening system 102. When this occurs, the spring latch 182 becomes disengaged from the recessed portion 140 in the locking plate and the sliding channel bracket assembly is therefore free to slide along the rail 106 as regulated by the door lifting bracket 108 traveling along the rail 106. As such, the pulley system 120 operates to lower the items in storage towards a garage floor.

In operation, a user secures a bicycle or other item to be stored to the one or more J-shaped hooks 158 of the lifting arm assembly 150. The user then activates the motor 104 of the garage door opening system 102, and as the door lifting bracket 108 moves towards the garage door opening (i.e. closing of the garage door), the door lifting bracket 108 causes the sliding channel bracket assembly 126 to move along the rail 106 and towards the latching mechanism 180 thereby activating the pulley system 120 to retract cable 124. As previously discussed, as the locking plate 130 of the sliding channel bracket assembly 126 approaches and engages the spring latch 182, the bicycle or other component is secured in a stored position. When the locking plate 130 is engaged in the spring latch 182, the bicycles are automatically locked in a storage position and the garage door 110 is able to open or close without triggering movement of the pulley system 120.

In order to release, the bicycle or other component from the stored position, it is necessary for a user to pull the release cord 190 while activating the motor 104 of the powered garage door opening system. This will cause the locking plate 130 to become disengaged from the spring latch 182 and as the door lifting bracket 108 moves along the rail 106, so will the sliding channel bracket assembly 126, thereby lowering the cable 124 of the pulley system 120, and any stored items, to a garage floor.

Figure 15:
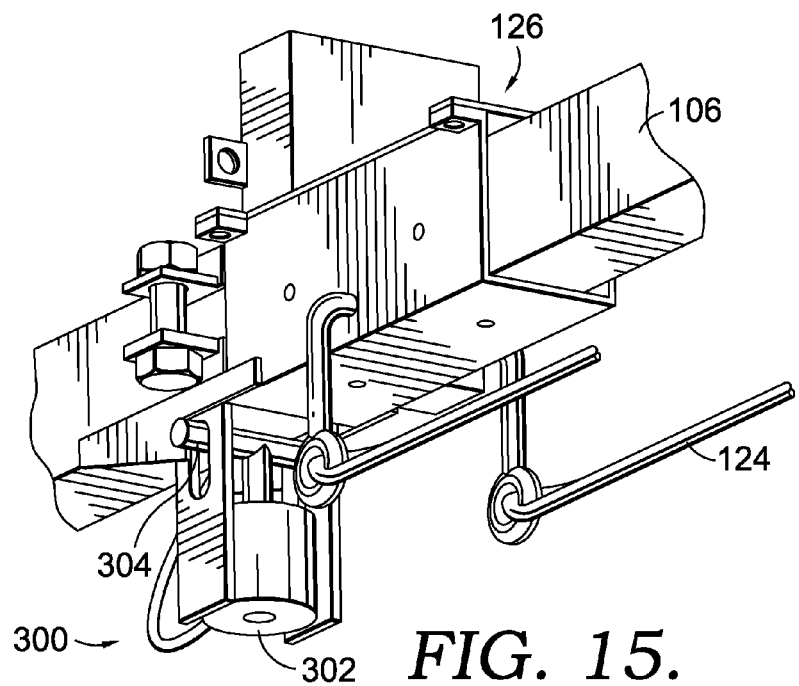
FIG. 15 is a perspective view depicting an electromechanical latch and release systems in accordance with an embodiment of the present invention.
Figure 16:
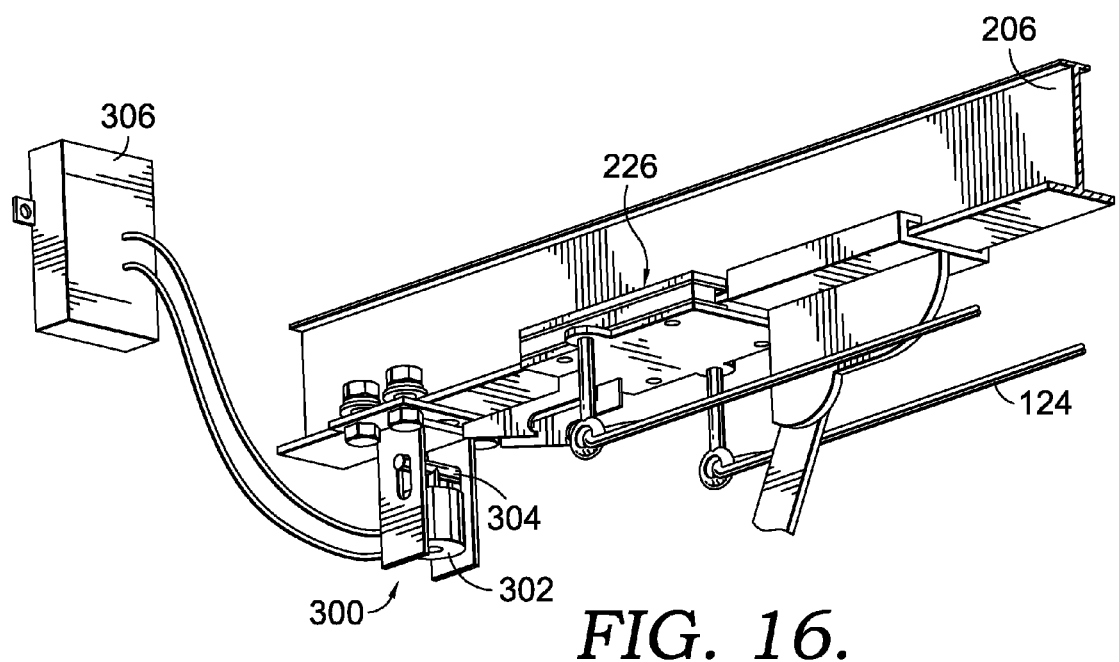
FIG. 16 is a perspective view depicting an alternate electromechanical latch and release systems in accordance with an alternate embodiment of the present invention.

Referring to FIGS. 15 and 16, an alternate embodiment of the present invention is depicted in which the spring latch 182 and release cord 190 are replaced with an electromechanical latch 300. In this configuration, the latch is a solenoid 302 with a T-shaped arm 304. A control box 306 would switch a low voltage DC power through a transistor to activate the magnetic coil of the solenoid 302. The magnetic coil would pull the arm down when activated and a spring on the solenoid would push the T-arm 304 up when power is switched off. The signal wires to the control box 306 are connected to an auxiliary button mounted on the garage door wall button or an auxiliary push-type button.

During latch activation, the T-shaped arm 304 engages the recessed portion of the locking plate as discussed above. In order to release the pulley system from the latch, an electrical switch must be activated by an operator of the lifting and storage mechanism. More specifically, the electromechanical switch 300 is activated as an operator holds the push-type button while hitting the remote on the garage door opener system so as to activate the motor 104.

The present invention has been described in relation to particular embodiments, which are intended in all respects to be illustrative rather than restrictive. Alternative embodiments will become apparent to those of ordinary skill in the art to which the present invention pertains without departing from its scope. Substitutions may be made and equivalents employed herein without departing from the scope of the invention as recited in the claims. It will be understood that certain features and subcombinations are of utility and may be employed without reference to other features and subcombinations. This is contemplated and within the scope of the claims.

The invention claimed is:

1. A lifting and storage mechanism comprising:
   a powered garage door opening system comprising a motor contained within a housing, a rail coupled to the housing, and a door lifting bracket coupled to an upper region of a garage door at one end and to the rail at an opposing end to the rail;
   a pulley system in operational communication with the powered garage door opening system and having a plurality of pulley wheels, at least one cable, and a sliding channel bracket assembly;
   a spring latch coupled to the rail and selectively coupled to the sliding channel bracket assembly for securing the pulley system in a storage position; and,
   a lifting arm assembly secured to the pulley system and having at least one J-shaped hook;
   wherein the sliding channel bracket assembly is positioned adjacent the door lifting bracket of the powered garage door opening system such that the sliding channel bracket assembly generally travels with the door lifting bracket so as to control movement of the pulley system, thereby regulating a vertical height of the at least one J-shaped hook of the pulley system.

2. The mechanism of claim 1, wherein the rail has a generally square cross-sectional shape when the cross-sectional shape is taken perpendicular to a longitudinal-extending direction.

3. The mechanism of claim 1, wherein the rail has a generally T-shaped cross section when the cross-sectional shape is taken perpendicular to a longitudinal-extending direction.

4. The mechanism of claim 1, wherein the powered garage door opening system is suspended from the ceiling of a garage by a plurality of angle brackets and coupled to a garage door by the rail.

5. The mechanism of claim 1, further comprising angled brackets secured adjacent a ceiling of a garage for providing one or more elevated storage regions.

6. The mechanism of claim 5, wherein the pulley system lowers the one or more J-shaped hooks from the elevated storage position upon actuation of the motor.

7. The mechanism of claim 5, wherein the pulley system raises the one or more J-shaped hooks into the elevated storage position upon actuation of the motor.

8. The mechanism of claim 1, wherein two J-shaped hooks support a bicycle in a elevated storage region.

9. The mechanism of claim 8, wherein the spring latch secures the bicycle in a stored position when the garage door is in a closed position.

10. The mechanism of claim 1, wherein the sliding bracket channel assembly engages the rail and is capable of sliding along the rail.

11. The mechanism of claim 10, wherein the sliding channel bracket assembly is capable of remaining adjacent the door lifting bracket due to the weight of the lifting arm assembly.

* * * * *